United States Patent [19]

Meyer et al.

[11] Patent Number: 5,008,033
[45] Date of Patent: Apr. 16, 1991

[54] INTERNAL MOLD RELEASE COMPOSITIONS

[75] Inventors: Louis W. Meyer, Livingston, Tex.; J. Alan Vanderhider, Fruthwilen, Switzerland; Robert Carswell, Lake Jackson, Tex.

[73] Assignee: The Dow Chemical Company, Midland, Mich.

[21] Appl. No.: 365,625

[22] Filed: Jun. 12, 1989

Related U.S. Application Data

[63] Continuation-in-part of Ser. No. 466,826, Feb. 16, 1983, abandoned, and Ser. No. 570,141, Jan. 12, 1984, Pat. No. 4,876,019.

[51] Int. Cl.$^5$ .................... C08K 5/09; C08L 75/12; C08L 75/02
[52] U.S. Cl. .................... 252/182.13; 252/182.24; 252/182.26; 252/182.27; 521/51; 521/105; 521/107; 521/111; 521/124; 521/126; 521/127; 521/163; 521/167; 524/701; 524/711; 524/731; 524/773; 524/779; 524/780; 524/781; 524/783; 524/784; 524/785; 524/786; 524/874
[58] Field of Search .................... 252/182.13, 182.24, 252/182.26, 182.27; 521/51, 105, 107, 111, 124, 126, 127, 163, 167; 524/701, 711, 731, 773, 779, 780, 781, 783, 784, 785, 786, 874

[56] References Cited

U.S. PATENT DOCUMENTS

| | | | |
|---|---|---|---|
| 3,261,813 | 7/1966 | Ramos | 528/58 |
| 3,484,517 | 12/1969 | Ligon | 524/874 |
| 3,544,609 | 12/1970 | Forbes | 252/37.5 |
| 3,563,906 | 2/1971 | Hoeschle | 252/182 |
| 3,580,869 | 5/1971 | Rhodes | 521/167 |
| 3,629,168 | 12/1971 | Ryan | 524/874 |
| 3,649,661 | 3/1972 | Otto | 252/32.5 |
| 3,655,597 | 4/1972 | Strassel | 521/51 |
| 3,681,291 | 8/1972 | Khan | 528/64 |
| 3,726,952 | 4/1973 | Boden et al. | 264/48 |
| 3,740,377 | 6/1973 | Huffman | 528/57 |
| 3,808,131 | 4/1974 | Otto | 252/33.6 |
| 3,839,292 | 10/1974 | Ermidis | 252/182 |
| 3,925,527 | 12/1975 | Kleimann et al. | 264/53 |
| 3,939,106 | 2/1976 | Dunleavy | 252/182 |
| 3,977,989 | 8/1976 | Taub | 252/182 |
| 3,993,606 | 11/1976 | von Bonin et al. | 260/2.5 AH |
| 4,002,584 | 1/1977 | Takahashi | 528/58 |
| 4,024,088 | 5/1977 | Godlewski | 260/2.5 A |
| 4,033,912 | 7/1977 | Kleimann et al. | 260/2.5 AH |
| 4,048,105 | 9/1977 | Salisbury | 521/51 |
| 4,058,492 | 11/1977 | von Bonin et al. | 260/2.5 AM |
| 4,076,695 | 2/1978 | Keil | 260/77.5 AM |
| 4,089,822 | 5/1978 | Vial | 528/58 |
| 4,098,731 | 7/1978 | von Bonin et al. | 521/51 |
| 4,107,151 | 8/1978 | Takahashi | 528/58 |
| 4,111,861 | 9/1978 | Godlewski | 521/123 |
| 4,201,847 | 5/1980 | Kleimann | 252/182 |
| 4,204,090 | 5/1980 | von Bonin et al. | 260/2.5 AH |
| 4,218,543 | 8/1980 | Weber et al. | 521/51 |
| 4,292,411 | 9/1981 | Jourquin | 521/124 |
| 4,296,212 | 10/1981 | Ewen | 521/163 |
| 4,324,867 | 10/1981 | Patton | 521/159 |
| 4,336,180 | 6/1982 | Recker | 524/874 |
| 4,390,640 | 6/1983 | Rasshofer | 521/51 |
| 4,396,729 | 8/1983 | Dominquez | 521/110 |
| 4,433,067 | 2/1984 | Rice | 521/51 |
| 4,436,841 | 3/1984 | Rasshofer | 252/182 |
| 4,442,236 | 4/1984 | Rasshofer et al. | 521/130 |
| 4,519,965 | 5/1985 | Taylor | 528/55 |
| 4,581,386 | 4/1986 | Taylor | 521/125 |
| 4,585,803 | 4/1986 | Nelson | 524/701 |
| 4,753,966 | 6/1988 | Haas | 528/52 |
| 4,766,172 | 8/1988 | Weber et al. | 528/55 |
| 4,774,263 | 9/1988 | Weber | 264/328.6 |
| 4,774,264 | 9/1988 | Weber | 264/328.6 |
| 4,792,576 | 12/1988 | Nodelman | 264/300 |
| 4,868,224 | 9/1989 | Harasin | 521/124 |
| 4,895,879 | 1/1990 | Nelson | 521/105 |
| 4,897,428 | 1/1990 | Dewhurst | 264/328.6 |
| 4,965,293 | 10/1990 | Sanns | 521/124 |

FOREIGN PATENT DOCUMENTS

| | | |
|---|---|---|
| 560836 | 6/1983 | Australia . |
| 1218190 | 2/1987 | Canada . |
| 81701 | 6/1983 | European Pat. Off. . |
| 0119471 | 9/1984 | European Pat. Off. . |
| 1505208 | 3/1978 | United Kingdom . |
| 1534258 | 11/1978 | United Kingdom . |
| 2101140 | 1/1983 | United Kingdom . |

OTHER PUBLICATIONS

Periodic Table of Elements, Sargent-Welsh Catalogue No. S-18806, copyright 1962.

*Primary Examiner*—C. Warren Ivy

[57] ABSTRACT

Active hydrogen-containing compositions having internal mold release components for use in preparing molded polymeric products are disclosed which contain (a) a primary or secondary amine, (b) a carboxylic acid or amido carboxylic acid salt of a group II metal or of aluminum, lithium, copper, iron, cobalt or nickel, and optionally (c) a carboxylic acid or amido carboxylic acid.

54 Claims, No Drawings

INTERNAL MOLD RELEASE COMPOSITIONS

CROSS-REFERENCE TO RELATED APPLICATION

This is a continuation-in-part of application Ser. No. 466,826 filed Feb. 16, 1983(now abandoned), and a continuation-in-part of application Ser. No. 570,141, filed Jan. 12, 1984 (now U.S. Pat. No. 4,576,019), both incorporated herein by reference. It is related to application Ser. No. 749,710, 749,849 and 749,850, all filed June 18, 19185 (all now abandoned) and incorporated herein by reference.

BACKGROUND OF THE INVENTION

The present invention pertains to internal mold release compositions, to polyol compositions containing same and processes for preparing polymeric products.

Polyether polyurethane moldings are being increasingly used in the manufacture of automobiles, furniture and in home construction. Molded polyether polyurethanes are especially important because they are lightweight and are resistant to moisture, weather, temperature extremes, and aging. As an illustration, molded polyether polyurethane elastomers have become of special interest in the manufacture of force-reducing impact media such as safety impact bumpers for automotive vehicles and impact resistant automotive fascia.

The high demand for molded polyether polyurethane articles requires that they be produced in the largest numbers in the shortest possible time. Polyurethane-forming mixtures are eminently suited for mass production because the reactants are liquid, that is they are pumpable, and are quick-reacting. The problem has existed, however, in providing adequate mold release in the shortest possible time to take fullest advantage of the unique capabilities of the polyurethane systems.

Heretofore, release of molded articles from molds in which they have been formed has been achieved by coating the surface of the mold cavity with an agent which facilitates release of the molded article from the walls of the mold cavity. Procedures such as this are described in U.S. Pat. No. 3,694,530; 3,640,769; 3,624,190; 3,607,397 and 3,413,390. This method has certain disadvantages. The agent, after molding, adheres to the surface of the molded article thereby removing such from the surface of the mold. As the mold release agent is removed from the mold surface, it must of the molded articles from the mold. The necessity for repeated additions of mold release agent results in higher costs due to low productivity as a result of the additional time incurred in applying such additional quantities of mold release agents to the mold surfaces.

In addition, mold build-up may become a problem, since a fine film of urethane is left in spot areas of the mold surface. This build-up on the surface of the mold cavity walls eventually covers and obscures any detail on the mold cavity surface desired to be imparted to the molded article. Also, the presence of the release agent adhering to the surface of the molded article can impede subsequent operations on the article, such as painting or adhering operations.

Additionally, the need to reapply the release agent after each molding or a limited number of moldings interrupts the molding operation and slows down output.

The use of internal mold release agents for use in molding polyurethane articles has been disclosed by Boden et al. in U.S. Pat. No. 3,726,952, Godlewski in U.S. Pat. No. 4,024,088, Bonin et al. in U.S. Pat. No. 4,098,731, Sparrow et al. in U.S. Pat. No. 4,130,698, Godlewski in U.S. Pat. No. 4,111,861, Kleimann et al. in U.S. Pat. No. 4,201,847 and Godlewski in U.S. Pat. No. 4,220,727.

Some of these internal mold release agents bleed or creep to the surface of the molded article. Some of these articles cannot be painted even after appropriate preparation steps for painting has been done. Others are incompatible with polyether polyols. Most of them seriously reduce the activity of the catalyst. Almost all show degradation of physical properties such as reduced elongation.

The use of the "salts" described in U.S. Pat. No. 3,726,952 have not been effective release agents for reaction injection molding (RIM). While showing release characteristics per se their use has demonstrated in a screening program wherein hand mixed formulations are cast into an open mold other serious problems, namely; (1) degradation of the tin catalyst employed in the formulation, (2) excessively long gel and cure time, and (3) poor physical properties. These problems are believed to be caused by the presence of free carboxylic acid. It is released from the salt by the reaction of the amine with the isocyanate, and it is believed that the presence of these free carboxylic acids, or any acid, interferes with the cure rate of the hydroxyl-isocyanate reaction to form a urethane structure as disclosed in *J. Polymer Science*, Polymer Chemistry Edition, Vol. 19, 381–388 (1981) John Wiley & Son, Inc.

The reactivity or catalyst kill problem can be overcome to a certain degree by using tertiary amines in place of primary or secondary amines. Both U.S. Pat. No. 3,726,952 and 4,098,731 describe this technique. Since isocyanates cannot react with tertiary amines the salt cannot be split; it thus remains neutral (the carboxylic acid is not free), hence, catalyst kill does not seem evident. The use of tertiary amines, however, often shows bleed out or exudation problems which in turn result in poor paint adhesion Further, retention of physical properties is seldom possible because of either excess reactivity when using very catalytically active amines, or because of plasticizer effects brought about by excessively long tertiary amine molecules.

The technology of U.S. Pat. No. 4,111,861 states that polar metal compounds can be employed to overcome catalyst kill problems brought on by the presence of fatty carboxylic acids. It states that metal ions must be present in an amount sufficient to neutralize the acid. Reference is made to the use of the Bi, Pb, Na, Li, and K ion, with sodium carbonate, sodium oleate, and potassium laurate being exemplified. They also show sodium oleate alone to be an effective release agent. When evaluated in RIM polyol systems as a single additive, it failed to show adequate release characteristics in a screening program wherein hand mixed formulations were cast into an open mold.

Zinc stearate has long been known to be an effective release agent for most thermoplastics. It is also used in polyester sheet molding compounds. When evaluated in RIM polyol systems containing only hydroxyl groups as the active hydrogen-containing source, zinc stearate as a single additive failed to show adequate release characteristics in a screening program wherein hand mixed formulations were cast into an open mold. Zinc stearate was observed to dissolve in a mixture of oleoyl sarcosine and excess polyoxypropylene diamine of 400 MW and the resultant mixture performed as an effective mold release agent.

The present invention provides for an improvement in one or more of the following: (1) increased multiple release, (2) increased ease of release, (3) effective and very stable catalyst reactivity, and (4) minimally altered physical properties in molded parts.

SUMMARY OF THE INVENTION

One aspect of the present invention pertains to an active hydrogen-containing composition comprising (A) a material having an average of at least about 2 active hydrogen-containing groups per molecule and a weight from about 500 to about 5000 per active hydrogen-containing group, said composition having dissolved therein (B) from about 0.5 to about 10 parts by weight per 100 parts by weight of component (A), of a metal salt of an organic material containing at least one carboxylic acid group and a saturated or unsaturated aliphatic hydrocarbon chain having at least about 7 carbon atoms or a siloxane chain wherein said metal is selected from Groups I-B, II-B, III-A, IV-B, V-B, VI-B, VII-B or VIII-B of the Periodic Table of the Elements, Sn, Pb, Sb or Bi;

said composition containing a sufficient quantity of at least one aliphatic primary and/or secondary amine-containing material such that component (B) is soluble in said composition. Said composition may contain or be devoid of an organic material containing at least one carboxylic acid group, phosphorus-containing acid group or boron-containing acid group or mixture of such materials wherein said organic material contains a siloxane chain or contains at least one terminal or pendant saturated or unsaturated aliphatic hydrocarbon chain containing at least about 7 carbon atoms. The aliphatic primary and/or secondary amine-containing material may be component (A), and/or another component in the composition.

Another aspect of the invention pertains to an active hydrogen-containing composition comprising (A) a material having an average of at least about 2 active hydrogen-containing groups per molecule and a weight per active hydrogen-containing group from about 500 to about 5000, said composition having dissolved therein (B) from about 0.5 to about 10 parts by weight per 100 parts by weight component (A) of a metal salt of an organic material containing at least one carboxylic acid group and a saturated or unsaturated aliphatic hydrocarbon chain having at least about 7 carbon atoms or a siloxane chain wherein said metal is selected from Groups I-B, II-B, III-A, IV-B, V-B, VI-B, VII-B or VIII-B of the Periodic Table of the Elements, Sn, Pb, Sb or Bi;

said composition containing a sufficient quantity of at least one primary and/or secondary amine-containing material such that component (B) is soluble in said composition. The composition may contain or be devoid of an organic material containing at least one carboxylic acid group, phosphorus-containing acid group or boron-containing acid group or mixture of such materials wherein said organic material contains a siloxane chain or contains at least one terminal or pendant saturated or unsaturated aliphatic hydrocarbon chain containing at least about 7 carbon atoms. The primary and/or secondary amine-containing material may be component (A), and/or another component in the composition.

In another aspect, this invention is an active hydrogen-containing composition comprising (I) a polyether polyol terminated in primary or secondary hydroxyl groups and having a hydroxyl equivalent weight of from about 100 to about 2500; and (II) an internal mold release composition which comprises (A) a metal salt of a carboxylic acid having a terminal or pendant saturated or unsaturated aliphatic hydrocarbon chain having at least seven carbon atoms attached to a carbonyl group and from about 10 to 29 carbon atoms per moleucle, wherein said metal is a member of Group II-B of the Periodic Table of Elements, aluminum, copper, iron, cobalt or nickel;

(B) a material containing at least one aliphatic primary amine group and/or at least one aliphatic secondary amine group per molecule or a mixture of such materials; and (C) a monocarboxylic acid having from about 10 to about 29 carbon atoms per molecule;

and wherein the components are employed in quantities such that (i) the weight ratio of components (II-C):(II-A) is from about 0.3:1 to about 3:1; and components (II-C) and (II-B) are employed in quantities which provide from about 0.04 to about 2 equivalents of component (II-C) per amine nitrogen equivalent of component (II-B);

and the composition contains from about 0.5 to about 20 parts of component (II-A) per 100 parts by weight component (I)

In another aspect, this invention is an active hydrogen-containing composition comprising (I) a polyether polyol terminated in primary or secondary hydroxyl groups and having a hydroxyl equivalent weight of from about 100 to about 2500; and (II) an internal mold release composition which comprises (A) a metal salt of a carboxylic acid having a terminal or pendant saturated or unsaturated aliphatic hydrocarbon chain having at least seven carbon atoms attached to a carbonyl group and from about 10 to 29 carbon atoms per moleucle, wherein said metal is a member of Group II-B of the Periodic Table of Elements, aluminum, copper, iron, cobalt or nickel; and (B) a material containing at least one aliphatic primary amine group and/or at least one aliphatic secondary amine group per molecule or a mixture of such materials;

said composition being devoid of an organic material containing at least one carboxylic acid group, phosphorus-containing acid group or boron-containing acid group or mixture of such materials wherein said organic material contains a siloxane chain or contains at least one terminal or pendant saturated or unsaturated aliphatic hydrocarbon chain containing at least about 7 carbon atoms;

wherein the components are employed in quantities such that components (II-A) and (II-B) are employed in quantities which provide from about 0.04 to about 2 equivalents of component (II-A) per amine nitrogen equivalent of component (II-B) and the composition contains from about 0.5 to about 20 parts of component (II-A) per 100 parts by weight component (I).

The term polymer as employed herein means those polymers containing urethane and/or urea groups.

The term effective amount of an internal mold release as employed herein means that quantity which will permit a molded part prepared from reaction of the active hydrogen-containing composition with a composition containing a plurality of —NCO and/or —NCS groups to be easily removed from its mold.

The term total hydrogen equivalent weight as employed herein means the molecular weight divided by the total number of hydrogen atoms in the molecule which are connected to nitrogen, oxygen and sulfur atoms. The term "weight per active hydrogen-containing group" means the molecular weight of the molecule referred to divided by the number of groups containing isocyanate-reactive hydrogen atoms.

The term equivalent ratio as it pertains to the ratio of the acid salt or acid component and the amine component means the ratio of the number of

equivalents contained in the acid salt or acid component to the number of amine nitrogen equivalents contained in the amine component. The amine nitrogen equivalents of a compound is equal to the number of primary or secondary nitrogen atoms per molecule of that compound.

By the term lipophilic as employed herein it is meant that the material contains at least one member of the group consisting of R—CH$_3$ wherein R is a saturated or unsaturated aliphatic hydrocarbon group having at least 6 carbon atoms.

All references to "soluble" or "solubility" refer to solubility at a temperature of about 25° C.

Any reference herein to the Periodic Table of the Elements refers to that published by Sargent-Welch Scientific Company as catalog number S-18806, 1968.

DETAILED DESCRIPTION OF THE INVENTION

Suitable carboxylic acids which can be employed herein as a component in the internal mold release composition include any saturated or unsaturated aliphatic or cycloaliphatic carboxylic acid or aromatic carboxylic acid, preferably those carboxylic acids having from about 2 to about 30, preferably from about 2 to about 18, carbon atoms.

Also suitable as carboxylic acids are those represented by the formula

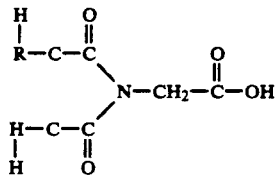

wherein R is a hydrocarbyl group having from 1 to 12 carbon atoms.

Particularly suitable carboxylic acids include, for example, oleic acid, lauric acid, palmitic acid, stearic acid, mixtures thereof and the like.

Suitable carboxylic acids include amido-containing carboxylic acids such as the reaction products of carboxylic acid halides containing from about 1 to about 30, preferably from about 2 to about 18, most preferably from about 5 to about 18, carbon atoms with an amino carboxylic acid having from about 2 to about 4, preferably from about 2 to about 3, carbon atoms per molecule.

Particularly suitable carboxylic acids include amido-containing carboxylic acids such as those represented by the general formula

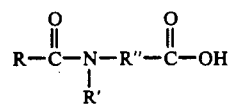

wherein R is a hydrocarbon or substituted hydrocarbon group having from 1 to about 29, preferably from about 2 to about 17, carbon atoms; R' is hydrogen, an alkyl or hydroxyl substituted alkyl group having from 1 to about 3 carbon atoms and R" is a divalent hydrocarbon group having from 1 to about 3, preferably 1, carbon atoms, such as, for example, oleoyl sarcosine, lauryl sarcosine, capryl sarcosine, oleoyl glycine, octanol glycine, oleoyl hydroxyethyl glycine, mixtures thereof and the like. These amido carboxylic acids can be prepared by the Schotten-Baumann acylation reaction wherein an acyl halide is reacted with an amino acid.

Suitable materials containing at least one carboxylic acid group and containing siloxane chains include those described by J. W. Keil in U.S. Pat. No. 4,076,695 which is incorporated herein by reference.

Suitable organic materials containing at least one phosphorus-containing acid group include, for example, monostearyl acid phosphate, cetyl dihydrogen phosphate, monolauryl phosphate, decyl dihydrogen phosphate, monobutyl monodecyl ester of phosphoric acid, mixtures thereof and the like.

Suitable organic materials containing at least one boron-containing acid group include, for example, dioctadecyl ester of boric acid, monododecyl mono(phenylmethyl) ester of boric acid, monododecyl monophenyl ester of boric acid, monoheptadecyl mono(phenylmethyl) ester of boric acid, monodecyl ester of boric acid, mixtures thereof and the like.

Suitable amines which can be employed herein as a component in the internal mold release composition include any aliphatic, cycloaliphatic, or aromatic compound containing at least one primary or secondary amine group with those compounds having at least two primary and/or secondary amine groups being especially preferred.

Suitable amine compounds include, for example, oleyl amine, coco amine, talloil amine, ethanolamine, diethyltriamine, ethylenediamine, propanolamine, aniline, mixtures thereof and the like.

Particularly suitable as the amine component in the internal mold release composition are these aliphatic amines enumerated later on as being low equivalent weight amine-containing active hydrogen-containing materials, and aromatic amines of relatively low molecular weight active hydrogen-containing materials also enumerated later on. Examples of such particularly suitable amines include the compounds of aminated polyoxyalkane glycols, hexamethylene diamine, diethylenetriamine, and hydrocarbyl substituted aromatic amines such as, for example, diethylenetoluenediamine.

Suitable carboxylic acid or amido carboxylic acid salts of metals which can be employed herein as a component in the internal mold release composition include those containing the metal ions from group II metals, lithium, copper, aluminum, iron, cobalt, and nickel. The organic portions of these compounds are suitably saturated or unsaturated having from about 2 to about 30, preferably from about 2 to about 21 carbon atoms. Particularly suitable metal salts of carboxylic acids or amido carboxylic acids include, for example, zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate, copper palmitate, zinc stearoyl sarcosinate, zinc oleoyl sarcosinate, zinc palmitoyl sarcosinate, zinc lauroyl sarcosinate, calcium stearoyl sarcosinate, calcium oleoyl sarcosinate, calcium palmitoyl sarcosinate, calcium lauroyl sarcosinate, magnesium stearoyl sarcosinate, magnesium oleoyl sarcosinate, magnesium palmitoyl sarcosinate, magnesium lauroyl sarcosinate, nickel stearoyl sarcosinate, nickel oleoyl sarcosinate, nickel palmitoyl sarcosinate, nickel lauroyl sarcosinate, copper stearoyl sarcosinate, copper oleoyl sarcosinate, copper palmitoyl sarcosinate, copper lauroyl sarcosinate or mixtures thereof and the like. Of particular interest are those represented by the formula:

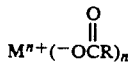

wherein M represents the metal, R represents an organic group containing a terminal or pendant saturated or unsaturated aliphatic hydrocarbon chain containing at least about 7 carbon atoms, and n is equal to the valance of the metal.

Suitable carboxylic acid salts containing siloxane chains herein include the Group II, aluminum, lithium, copper, iron, cobalt or nickel salts of the acids described in the aforementioned U.S. Pat. No. 4,076,695.

The partially or totally reacted, complexed or associated acid or amido acids with the metals of Group II of the Periodic Table of the elements, aluminum, lithium, copper, iron, cobalt or nickel can be prepared by reacting such acids or amido acids with the appropriate quantity of a compound containing the metal such as a hydroxide or if the metal is above hydrogen in the electromotive series, it can be reacted directly with the acid or acid amide.

Also, mixtures of the acids and metal salts of the acids which are available commercially can be employed when partially reacted, complexed or associated materials are desired. Likewise, commercially available metal salts of the acids or amido acids can be employed when the totally reacted, complexed or associated materials are desired.

The metal salt advantageously is present in an amount from about 0.1, preferably about 0.25, more preferably about 0.5, most preferably about 1.0 part by weight, up to about 20, preferably up to about 10, more preferably up to about 6, most preferably up to about 4 parts by weight per 100 parts of the material referred to a component (A) in the claims.

For purposes of the present invention, the total hydrogen equivalent weight is determined by dividing the molecular weight by all of the hydrogen atoms contained in any material derived from —OH, —NH and —SH groups, regardless of whether or not the group reacts with an NCO or NCS group when preparing molded articles.

In some instances the quality of the metal salt of a carboxylic acid or metal salt of an amido-containing carboxylic acid may affect the performance of the internal mold release composition. This is believed to be particularly true with the use of zinc stearate in urethane reaction injection molding systems.

Suitable materials which can be employed herein as relatively high equivalent weight hydroxyl-, primary amine- or secondary amine-containing materials include, for example, those hydroxyl and/or amine materials having an average hydrogen functionality of from 2 to about 8, preferably from 2 to 4 and a weight of from about 500 to about 5000, preferably from about 1000 to about 3000, per active hydrogen-containing group.

Suitable relatively high equivalent weight hydroxyl-containing polyols which can be employed herein include, for example, those polyether and polyester polyols which have an average hydroxyl functionality of from about 2 to about 8, preferably from about 2 to about 4 and most preferably from about 2 to about 3 and an average hydroxyl equivalent weight of from about 500 to about 5000, preferably from about 1000 to about 3000 and most preferably from about 1500 to about 2500, including mixtures thereof.

Suitable relatively high equivalent weight polyether polyols which can be employed herein include those which are prepared by reacting an alkylene oxide, halogen substituted or aromatic substituted alkylene oxides or mixtures thereof with an active hydrogen-containing initiator compound.

Suitable such oxides include, for example, tetrahydrofuran, ethylene oxide, propylene oxide, 1,2 -butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high equivalent weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4,'-diaminodiphenylmethane, 1,3-phenylenediamine, 1,4-phenylenediamine, naphthylene-1,5-diamine, triphenylmethane-4,4',4"-triamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenylpolymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g., with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride maleic acid; maleic acid anhydride; fumaric acid; dimeric and trimeric fatty acids such as oleic acid, which may be in admixture with monomeric fatty acids, terephthalic acid dimethyl ester; terephthalic acid bis-glycol ester and the like. Mixtures of such acids or anhydrides may also be employed.

Examples of suitable polyhydric alcohols include ethylene glycol, 1,2-propylene glycol; 1,3 -propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Other suitable relatively high equivalent weight polyols which can be employed herein include polymer-containing polyols such as, for example, those disclosed in U.S. Pat. Nos. RE 29,118 (Stamberger), RE 28,715 (Stamberger), RE 29,014 (Pizzini et al.) and 3,869,413 (Blankenship et al.), Hoffman in U.S. Pat. No. 4,394,491 and Hoffman et al. in U.S. Pat. No. 4,390,645 all of which are incorporated herein by reference.

Also suitable as the relatively high equivalent weight polyols are the thiol derivatives of the aforementioned polyols such that all or a portion of the hydroxyl or amine groups are replaced with —SH groups.

Suitable materials which can be employed herein as relatively low equivalent weight active hydrogen-containing materials include one or more of any such materials containing either hydroxyl groups, primary amine groups, secondary amine groups or mixtures of such groups; such materials having an average active hydrogen functionality of from about 2 to about 16, preferably from about 2 to about 8 and an average active hydrogen equivalent weight of from about 15 to about 500, preferably from about 32 to about 200 and when the active hydrogen atoms are derived only from OH groups then the maximum equivalent weight is about 200.

Also suitable relatively high equivalent weight active hydrogen-containing materials are the products resulting from aminating the polyether and polyester polyols described above.

Suitable relatively low equivalent weight polyols which can be employed herein include, for example, ethylene glycol, propylene glycol, trimethylol propane, 1,4-butane diol, diethylene glycol, dipropylene glycol, bisphenols, hydroquinone, catechol, resorcinol, triethylene glycol, tetraethylene glycol, dicyclopentadienediethanol, glycerine, low molecular weight ethylene and/or propylene oxide derivatives of glycerine, ethylenediamine, diethylenetriamine, mixtures thereof and the like.

Suitable relatively low equivalent weight amine-containing active hydrogen-containing materials which can be employed herein include, for example, ethylenediamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof and the like.

Also suitable relatively low equivalent weight active hydrogen-containing materials are the aminated polyoxyalkylene glycols having an average amino hydrogen equivalent weight of from about 60 to about 110.

Suitable also as the relatively low equivalent weight active hydrogen-containing materials are the thiol derivatives of the aforementioned materials wherein at least one of the hydroxyl or amine groups has been replaced with an —SH group.

The term aliphatic amine as employed herein includes also the cycloaliphatic amines and heterocyclic aliphatic amines so long as they contain at least one primary or secondary amine group.

Suitable aromatic amines which can be employed herein as a relatively low molecular weight active hydrogen-containing material include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenylmethane, 4,4'-diaminodiphenylmethane, naphthalene-1,5-diamine, triphenylmethane-4,4',4''-triamine, 4,4'-di(methylamino)diphenylmethane, 1-methyl-2-methylamino-4-aminobenzene, polyphenylpolymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 4,4'-methylene-bis(2,6-diisopropylaniline), mixtures thereof and the like.

Suitable polyisocyanates include the organic aromatic polyisocyanates, aliphatic polyisocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p+-diphenylmethanediisocyanate, p-phenylenediisocyanate, naphthalenediisocyanate, polymethylene polyphenylisocyanates, mixtures thereof and the like.

Also suitable as organic aromatic and/or aliphatic polyisocyanates are the prepolymers prepared from such polyisocyanates and compounds having 2 or more active hydrogen atoms; as well as such polyisocyanates and/or prepolymers thereof which have been modified to contain uretonimine or carbodiimide linkages.

Suitable organic aliphatic polyisocyanates include, in addition to the hydrogenated derivatives of the above-mentioned organic aromatic polyisocyanates. 1,6-hexamethylenediisocyanate, isophoronediisocyanate, 1,4-cyclohexyldiisocyanate, 1,4-bis-isocyanatomethylcyclohexane, mixtures thereof and the like.

Also suitable are the corresponding polyisothiocyanates.

Preferably, the cross-linker or chain extender component employed herein is a combination comprising (1) at least one member selected from the group consisting of (a) hydroxyl-containing materials which are essentially free of aliphatic amine hydrogen atoms, have an average OH functionality of from about 2 to 4 and have an average OH equivalent weight of from about 30 to about 120 and (b) aromatic amine-containing materials which are essentially free of aliphatic amine hydrogen atoms and which contain at least two aromatic amine hydrogen atoms; and (2) at least one aliphatic amine-containing material having at least one primary amine group, an average aliphatic amine hydrogen functionality of from about 2 to about 16 and an average aliphatic amine hydrogen equivalent weight of from about 15 to about 500.

Most preferably, the cross-linker or chain extender component is a combination comprising components (1-b) and (2) such as, for example, a combination of an aminated polyoxypropylene glycol having an average molecular weight of about 400 and diethyltoluenediamine.

The polymers can be prepared either in the presence or absence of a catalyst. Those polymers prepared from amine-containing polyols do not usually require a catalyst although catalysts can be employed if desired. On the other hand, those polymers prepared from polyols which do not contain nitrogen atoms are prepared in the presence of a catalyst.

Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc mercury, cadmium, bismuth, antimony, iron, manganese, cobalt, copper, vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, mixtures thereof and the like.

Suitable amine catalysts include, for example, tetramethylbutanetriethylenediamine, triethylamine, tetramethylbutanediamine, N,N-dimethylethanolamine, N-ethylmorpholine, bis-(2-dimethylaminoethyl)ether, N-methylmorpholine, N-ethylpiperidine, 1,3-bis-(dimethylamino)-2-propanol, N,N,N',N'-tetramethylethylenediamine, mixtures thereof an the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol or they may be dissolved or dispersed in one of the components.

The catalysts, when employed, can be employed in quantities of from about 0.001 to about 5, preferably from about 0.01 to about 1 part per 100 parts of total polyol employed depending upon the activity of the catalyst. Very weak catalysts could possibly be employed in quantities above 5 parts per 100 parts of polyol.

If desired, the polyurethanes can be modified so as to contain isocyanurate or thioisocyanurate groups by employing relatively high NCO or NCS to active hydrogen ratios, e.g., greater than about 1.5:1, preferably greater than about 2:1, and employing a trimerization catalyst. Suitable trimerization catalysts which can be employed herein include, for example, the zwitterions disclosed by Kresta and Shen in U.S. Pat. No. 4,111,914 and the tertiary amines, alkali metal salts of lower alkanoic acids, mixtures thereof and the like as disclosed in U.S. Pat. No. 4,126,741 (Carleton et al.) all of which are incorporated herein by reference.

The zwitterions can also function as a catalyst for urethane formation, i.e., the NCX—OH reaction.

If desired, the densities of the polymers produced herein can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane or other polymer-forming components. Suitable such inert gases include, for example, nitrogen, oxygen, carbon dioxide, xenon, helium, mixtures thereof such as air and the like.

If desired, cell control agents can be employed, particularly when preparing foams or microcellular products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; L-520, L-5320 and L-5340 commercially available from Union Carbide Corp.; and B-1048 commercially available from PH. Goldschmidt, AG., mixtures thereof and the like.

The polyurethanes and other polymeric products may additionally contain, if desired, coloring agents, fire-retardant agents, fillers, modifiers and the like.

Suitable liquid and solid modifiers include those disclosed and described in U.S. Pat. Nos. 4,000,105 and 4,154,716 and so much thereof as pertains to suitable modifier substances are incorporated herein by reference. However, any such modifier described therein which fulfills the definition of any of the other components as described in this application are not considered as modifiers but rather as one of the components of the present invention.

Particularly suitable as the modifier or filler substances are fiberglass reinforcement fibers, particularly those having lengths of from about 1/16 inch (0.16 cm) to about ½ inch (1.27 cm) and milled glass fibers having a maximum length of 1/16 inch (0.16 cm), ⅛ inch (0.32 cm) and ¼ inch (0.64 cm) and the like. Other particularly suitable fillers are mica, wollastonite, and the like.

The components which react to form the polymeric products can be shaped or formed into useful articles by injecting the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

Particularly suitable injection methods for RIM applications include those disclosed in a paper entitled "THE BAYFLEX 110 SERIES—THE NEW GENERATION OF RIM MATERIALS", by W. A. Ludwico and R. P. Taylor presented at the SOCIETY OF AUTOMOTIVE ENGINEERS PASSENGER CAR MEETING, Detroit, Michigan, Sept. 26–30, 1977; a paper entitled "THE PROPERTIES OF HIGH MODULUS RIM URETHANES", by R. M. Gerkin and F. E. Critchfield presented at the above meeting; British Pat. No. 1,534,258 titled "PROCESS FOR THE PRODUCTION OF ELASTOMERIC POLYURETHANE-POLYUREA MOULDED PRODUCTS HAVING A COMPACT SURFACE SKIN" and a book by F. Melvin Sweeney entitled INTRODUCTION TO REACTION INJECTION MOLDING, Technomios, Inc., 1979.

When injecting a relatively rapid-setting blend into massive metal molds, it may be necessary in order for the molded article to have good surface characteristics to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

The following examples are illustrative of the present invention and are not to be construed as to limiting the scope thereof in any manner.

Following is a list of materials employed in the examples and comparative experiments.

For purposes of simplicity, all of the active hydrogen-containing materials employed herein are referred to as polyols regardless of whether the active hydrogen is a hydroxyl group or an amine group.

Polyol A is the reaction product of glycerine and propylene oxide at a molar ratio of about 1 to 6 respectively and having an equivalent weight of about 150.

Polyol B is the reaction product of Polyol A with propylene oxide and subsequently end-capped with ethylene oxide. The amount of ethylene oxide is about 18 percent by weight of the total weight of the polyol. The hydroxyl equivalent weight is about 1635. About 75 percent of the hydroxyl groups are primary hydroxyl groups.

Polyol C is ethylene glycol having an active hydrogen equivalent weight of about 31.

Polyetheramine A is an aminated polyoxypropylene glycol represented by the formula

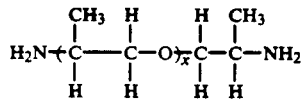

wherein x has a value of about 5.6. This product has an average amine hydrogen equivalent weight of about 100 and is commercially available from Texaco Chemical Co. as JEFFAMINE D-400.

Polyetheramine B is an aminated polyoxypropylene glycol represented by the formula

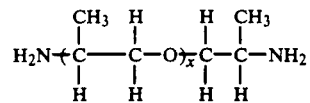

wherein x has a value of about 33.1. This product has an average amine hydrogen equivalent weight of about 500 and is commercially available from Texaco Chemical Company as JEFFAMINE D-2000.

Polyetheramine C is a 5000 molecular weight polyoxypropylene triol which had been aminated to an extent of about 80 percent which is commercially available from Texaco Chemical Co as JEFFAMINE T-5000.

Diamine A is an aromatic diamine consisting principally of diethyl toluene diamine. The material has an active hydrogen equivalent weight of about 89 and is commercially available from Ethyl Corporation.

Catalyst A is an organo-metal catalyst commercially available from Witco Chemical Company as UL-28, a proprietary organotin carboxylte catalyst commercially available from Witco Chemical Company. This catalyst is described by its manufacturer as a more active analog of dibutyltindilaurate and almost as active as dibutyltindiacetate. It is a yellow liquid having a pour point of −6° C., a refractive index of 1.47 at 25° C., a flash point (COC) of 153° C. and a specific gravity of 1.14 at 25° C.

Catalyst B is a 33 percent solution of triethylenediamine in dipropylene glycol commercially available from Air Products Company as DABCO 33LV.

Polyisocyanate A is a liquid, modified diphenylmethanediisocyanate containing carbodiimide linkages commercially available from Rubicon Chemicals, Inc. as RUBINATE LF-168 or Upjohn Chemical Co. as ISONATE 143L. The average NCO equivalent weight is about 143.

Polyisocyanate B is a liquid prepolymer prepared from reacting an excess of methylenediphenyl diisocyanate with tripropylene glycol commercially available from Rubicon Chemicals, Inc. as RUBINATE LF 179. This polyisocyanate has an NCO equivalent weight of about 182.

The following examples are illustrative of the present invention, but are not to be construed as to limiting the scope thereof in any manner.

General Procedure for Examples 1–4

The reactive mixtures of each formulation were hand mixed with a very low amount of catalyst, 0.05 parts (UL-28, Witco Chemical Co.), in order to extend reactivity time and also to better separate reactivity differences between the various samples tested. These mixtures were then hand cast into a 4 in.×12 in.×½ in. (10.16 cm×30.48 cm×1.27 cm) container made from aluminum foil. After casting, the samples were cured for 60 seconds in an oven at 150° F. (65.5° C.). Upon removal from the oven attempts were made to pull the aluminum foil from the casting by peeling a 3-in. (7.62-cm) wide strip which was made by scoring with razor blades in the long direction of the molded parts. Ease of release was then judged and ranked according to the following scale:

| | |
|---|---|
| 8-10 Excellent release: | equates to a pull force of about 0.01 to about 0.33 pounds/in. (1.75 to 57.79 N/m) |
| 6-7 Marginal release: | equates to a pull force of about 0.34 to about 1.00 pounds/in. (59.54 to 175.13 N/m) |
| 1-5 Unacceptable release: | equates to pull force of about between >1.00 and about 10.00 pounds/in. (>175.13 to 1751.27 N/m) |
| 0 Sticks: | release equals to about 13.00 to 20.00 pounds/in. (2276.65 to 3502.54 N/m) |

Several original sample pulls were measured on an Instron machine and adjacent strips were pulled by hand. Once a feel for the ease of peel was established, the Instron comparison pulls were dropped and a subjective rating was given.

Reactivity was measured and identified by two separate points: (1) cream time and (2) cure time. Cream time is observed as the time at which the mixture of B side plus A side goes from liquid to cream, and cure time is observed as the time when the casting becomes tack free.

Example 1

Following the general procedure, various polyurethane-forming compositions were prepared and molded. The components and results are provided in Table I.

TABLE I

| COMPONENT AND RESULTS | EXPERIMENT LETTER[20] | | | | | | | | | | | | | |
|---|---|---|---|---|---|---|---|---|---|---|---|---|---|---|
| | A* | B* | C* | D* | E* | F* | G* | H | I | J | K | L* | M* | N |
| POLYOL B, | | | | | | | | | | | | | | |
| pbw[1] | 100 | 100 | 100 | 100 | 100 | 100 | 92.5 | 92.5 | 92.5 | 92.5 | 92.5 | 92.5 | 92.5 | 92.5 |
| ahe[2] | 0.061 | 0.061 | 0.061 | 0.061 | 0.061 | 0.061 | 0.057 | 0.057 | 0.057 | 0.057 | 0.057 | 0.057 | 0.057 | 0.057 |
| POLYETHERAMINE A, | | | | | | | | | | | | | | |
| pbw[1] | 0 | 0 | 0 | 0 | 0 | 0 | 7.5 | 7.5 | 7.5 | 7.5 | 7.5 | 7.5 | 7.5 | 7.5 |
| ahe[2] | 0 | 0 | 0 | 0 | 0 | 0 | 0.075 | 0.075 | 0.075 | 0.075 | 0.075 | 0.075 | 0.075 | 0.075 |
| POLYOL C, | | | | | | | | | | | | | | |
| pbw[1] | 18 | 18 | 18 | 18 | 18 | 18 | 18 | 18 | 18 | 18 | 18 | 18 | 18 | 18 |
| ahe[2] | 0.58 | 0.58 | 0.58 | 0.58 | 0.58 | 0.58 | 0.58 | 0.58 | 0.58 | 0.58 | 0.58 | 0.58 | 0.58 | 0.58 |
| OLEOYL SARCOSINE, | | | | | | | | | | | | | | |
| pbw[1] | 4 | 3 | 2 | 1 | — | — | 4 | 3 | 2 | 1 | — | — | — | — |
| equiv.[3] | 0.011 | 0.008 | 0.0057 | 0.0028 | — | — | 0.011 | 0.008 | 0.0057 | 0.0028 | — | — | — | — |
| OLEIC ACID, | | | | | | | | | | | | | | |
| pbw[1] | — | — | — | — | — | — | — | — | — | — | — | — | 4 | 3 |
| equiv.[3] | — | — | — | — | — | — | — | — | — | — | — | — | 0.014 | 0.011 |
| LAUROYL SARCOSINE, | | | | | | | | | | | | | | |
| pbw[1] | — | — | — | — | — | — | — | — | — | — | — | — | — | — |
| equiv.[3] | — | — | — | — | — | — | — | — | — | — | — | — | — | — |
| LAURIC ACID, | | | | | | | | | | | | | | |
| pbw[1] | — | — | — | — | — | — | — | — | — | — | — | — | — | — |
| equiv.[3] | — | — | — | — | — | — | — | — | — | — | — | — | — | — |
| ZINC STEARATE, pbw[1] | — | 1 | 2 | 3 | 4 | — | — | 1 | 2 | 3 | 4 | — | — | 1 |
| POLYISOCYANATE A, | | | | | | | | | | | | | | |
| pbw[1] | 91.7 | 91.7 | 91.7 | 91.7 | 91.7 | 91.7 | 96.4 | 96.4 | 96.4 | 96.4 | 96.4 | 96.4 | 96.4 | 96.4 |
| equiv.[3] | 0.641 | 0.641 | 0.641 | 0.641 | 0.641 | 0.641 | 0.641 | 0.641 | 0.641 | 0.674 | 0.674 | 0.674 | 0.674 | 0.674 |
| REACTIVITY TIME, | | | | | | | | | | | | | | |
| cream, sec. | 70 | 65 | 42 | 28 | 15 | 17 | 55 | 20 | 12 | 9 | 15 | 12 | 57 | 25 |
| cure, sec. | 120 | 75 | 50 | 32 | 20 | 25 | 60 | 25 | 20 | 13 | 17 | 15 | 63 | 40 |
| RELEASE VALUE | 5 | 6 | 7 | 6 | 0 | 0 | 8 | 9 | 9 | 9 | 0 | 0 | 8 | 8 |

| COMPONENT AND RESULTS | EXPERIMENT LETTER[20] | | | | | | | | |
|---|---|---|---|---|---|---|---|---|---|
| | O | P | Q | R | S | T* | U* | V* | W* |
| POLYOL B, | | | | | | | | | |
| pbw[1] | 92.5 | 92.5 | 92.5 | 92.5 | 92.5 | 100 | 100 | 100 | 100 |
| ahe[2] | 0.057 | 0.057 | 0.057 | 0.057 | 0.057 | 0.061 | 0.061 | 0.061 | 0.061 |
| POLYETHERAMINE A, | | | | | | | | | |
| pbw[1] | 7.5 | 7.5 | 7.5 | 7.5 | 7.5 | — | — | — | — |
| ahe[2] | 0.075 | 0.075 | 0.075 | 0.075 | 0.075 | — | — | — | — |
| POLYOL C, | | | | | | | | | |
| pbw[1] | 18 | 18 | 18 | 18 | 18 | 18 | 18 | 18 | 18 |
| ahe[2] | 0.58 | 0.58 | 0.58 | 0.58 | 0.58 | 0.58 | 0.58 | 0.58 | 0.58 |
| OLEOYL SARCOSINE, | | | | | | | | | |
| pbw[1] | — | — | — | — | — | — | — | — | — |
| equiv.[3] | — | — | — | — | — | — | — | — | — |
| OLEIC ACID, | | | | | | | | | |
| pbw[1] | 2 | — | — | — | — | 4 | 3 | 2 | 1 |
| equiv.[3] | 0.007 | — | — | — | — | 0.014 | 0.011 | 0.007 | 0.004 |
| LAUROYL SARCOSINE, | | | | | | | | | |
| pbw[1] | — | 3 | 2 | — | — | — | — | — | — |
| equiv.[3] | — | 0.011 | 0.007 | — | — | — | — | — | — |
| LAURIC ACID, | | | | | | | | | |
| pbw[1] | — | — | — | 3 | 2 | — | — | — | — |
| equiv.[3] | — | — | — | 0.015 | 0.01 | — | — | — | — |
| ZINC STEARATE, pbw[1] | 2 | 1 | 2 | 1 | 2 | — | 1 | 2 | 3 |

TABLE I-continued

| | | | | | | | | | |
|---|---|---|---|---|---|---|---|---|---|
| POLYISOCYANATE A, | | | | | | | | | |
| pbw[1] | 96.4 | 96.4 | 96.4 | 96.4 | 96.4 | 91.7 | 91.7 | 91.7 | 91.7 |
| equiv.[3] | 0.674 | 0.674 | 0.674 | 0.674 | 0.674 | 0.641 | 0.641 | 0.641 | 0.641 |
| REACTIVITY TIME, | | | | | | | | | |
| cream, sec. | 20 | 21 | 12 | 21 | 19 | 60 | 40 | 30 | 17 |
| cure, sec. | 30 | 25 | 20 | 45 | 33 | ∞ | 80 | 60 | 31 |
| RELEASE VALUE | 8 | 9 | 9 | 8 | 8 | 0 | 5 | 5 | 5 |

Example 2

The general procedure was employed using various components. The compositions and results are provided in Table II.

TABLE II

| COMPONENT AND RESULTS | EXPERIMENT LETTER[20] | | | | | | | | |
|---|---|---|---|---|---|---|---|---|---|
| | A | B | C | D | E | F | G | H | I |
| POLYOL B, | | | | | | | | | |
| pbw[1] | 92.5 | 92.5 | 92.5 | 92.5 | 92.5 | 92.5 | 92.5 | 92.5 | 92.5 |
| ahe[2] | 0.057 | 0.057 | 0.057 | 0.057 | 0.057 | 0.057 | 0.057 | 0.057 | 0.057 |
| POLYETHERAMINE A, | | | | | | | | | |
| pbw[1] | 7.5 | 7.5 | 7.5 | — | 7.5 | 7.5 | 7.5 | 7.5 | 7.5 |
| ahe[2] | 0.075 | 0.075 | 0.075 | — | 0.075 | 0.075 | 0.075 | 0.075 | 0.075 |
| POLYETHERAMINE B, | | | | | | | | | |
| pbw[1] | — | — | — | 37.5 | — | — | — | — | — |
| ahe[2] | — | — | — | 0.075 | — | — | — | — | — |
| POLYOL C, | | | | | | | | | |
| pbw[1] | 18 | 18 | 30 | 30 | 30 | 30 | 30 | 30 | 30 |
| ahe[2] | 0.58 | 0.58 | 0.967 | 0.967 | 0.967 | 0.967 | 0.967 | 0.967 | 0.967 |
| ZINC STEARATE, pbw[1] | 2 | — | 2 | 2 | 2 | 2 | 2 | 2 | 2 |
| ZINC ACETATE, pbw[1] | — | 0.69 | — | — | — | — | — | — | — |
| OLEOYL SARCOSINE, | | | | | | | | | |
| pbw[1] | 2 | 2 | 2 | 2 | — | — | — | — | — |
| equiv.[3] | 0.0057 | 0.0057 | 0.0057 | 0.0057 | — | — | — | — | — |
| STEAROYL SARCOSINE, | | | | | | | | | |
| pbw[1] | — | — | — | — | 2 | — | — | — | — |
| equiv.[3] | — | — | — | — | 0.0057 | — | — | — | — |
| LAUROYL SARCOSINE, | | | | | | | | | |
| pbw[1] | — | — | — | — | — | 2 | — | — | — |
| equiv.[3] | — | — | — | — | — | 0.007 | — | — | — |
| OCTOYL SARCOSINE, | | | | | | | | | |
| pbw[1] | — | — | — | — | — | — | 2 | — | — |
| equiv.[3] | — | — | — | — | — | — | 0.01 | — | — |
| HEXOYL SARCOSINE, | | | | | | | | | |
| pbw[1] | — | — | — | — | — | — | — | 2 | — |
| equiv.[3] | — | — | — | — | — | — | — | 0.011 | — |
| BEHENIC ACID, | | | | | | | | | |
| pbw[1] | — | — | — | — | — | — | — | — | 2 |
| ahe[2] | — | — | — | — | — | — | — | — | 0.0059 |
| STEARIC ACID, | | | | | | | | | |
| pbw[1] | — | — | — | — | — | — | — | — | — |
| ahe[2] | — | — | — | — | — | — | — | — | — |
| OLEIC ACID, | | | | | | | | | |
| pbw[1] | — | — | — | — | — | — | — | — | — |
| equiv.[3] | — | — | — | — | — | — | — | — | — |
| ISOSTEARIC ACID, | | | | | | | | | |
| pbw[1] | — | — | — | — | — | — | — | — | — |
| equiv.[3] | — | — | — | — | — | — | — | — | — |
| BENZOIC ACID, | | | | | | | | | |
| pbw[1] | — | — | — | — | — | — | — | — | — |
| equiv.[3] | — | — | — | — | — | — | — | — | — |
| ACETIC ACID, | | | | | | | | | |
| pbw[1] | — | — | — | — | — | — | — | — | — |
| equiv.[3] | — | — | — | — | — | — | — | — | — |
| POLYISOCYANATE A, | | | | | | | | | |
| pbw[1] | 96.4 | 96.4 | 152 | 149 | 152 | 152 | 152 | 152 | 152 |
| equiv.[3] | 0.674 | 0.674 | 1.063 | 1.042 | 1.063 | 1.063 | 1.063 | 1.063 | 1.063 |
| REACTIVITY TIME, | | | | | | | | | |
| cream, sec. | 12 | 9 | 7 | 7 | 9 | 8 | 12 | 15 | 25 |
| cure, sec. | 20 | 12 | 12 | 11 | 14 | 13 | 17 | 20 | 35 |
| RELEASE VALUE | 9 | 8 | 9 | 8 | 9 | 8 | 9 | 7 | 6 |

| COMPONENT AND RESULTS | EXPERIMENT LETTER[20] | | | | | | | | |
|---|---|---|---|---|---|---|---|---|---|
| | J | K | L | M | N | O* | P | Q | R |

TABLE II-continued

| | | | | | | | | | |
|---|---|---|---|---|---|---|---|---|---|
| POLYOL B, | | | | | | | | | |
| pbw[1] | 92.5 | 92.5 | 92.5 | 92.5 | 92.5 | 100 | 92.5 | 92.5 | 92.5 |
| ahe[2] | 0.057 | 0.057 | 0.057 | 0.057 | 0.057 | 0.061 | 0.057 | 0.057 | 0.057 |
| POLYETHERAMINE A, | | | | | | | | | |
| pbw[1] | 7.5 | 7.5 | 7.5 | 7.5 | 7.5 | — | 7.5 | 7.5 | 7.5 |
| ahe[2] | 0.075 | 0.075 | 0.075 | 0.075 | 0.075 | — | 0.075 | 0.075 | 0.075 |
| POLYETHERAMINE B, | | | | | | | | | |
| pbw[1] | — | — | — | — | — | — | — | — | — |
| ahe[2] | — | — | — | — | — | — | — | — | — |
| POLYOL C, | | | | | | | | | |
| pbw[1] | 30 | 30 | 30 | 30 | 30 | 30 | 30 | 30 | 30 |
| ahe[2] | 0.967 | 0.967 | 0.967 | 0.967 | 0.967 | 0.967 | 0.967 | 0.967 | 0.967 |
| ZINC STEARATE, pbw[1] | 2 | 2 | 2 | 2 | 2 | 2 | 2 | 2 | 2 |
| ZINC ACETATE, pbw[1] | — | — | — | — | — | — | — | — | — |
| OLEOYL SARCOSINE, | | | | | | | | | |
| pbw[1] | — | — | — | — | — | 2 | — | — | — |
| equiv.[3] | — | — | — | — | — | 0.0057 | — | — | — |
| STEAROYL SARCOSINE, | | | | | | | | | |
| pbw[1] | — | — | — | — | — | — | — | — | — |
| equiv. | — | — | — | — | — | — | — | — | — |
| LAUROYL SARCOSINE, | | | | | | | | | |
| pbw[1] | — | — | — | — | — | — | — | — | — |
| equiv.[3] | — | — | — | — | — | — | — | — | — |
| OCTOYL SARCOSINE, | | | | | | | | | |
| pbw[1] | — | — | — | — | — | — | — | — | — |
| equiv.[3] | — | — | — | — | — | — | — | — | — |
| HEXOYL SARCOSINE, | | | | | | | | | |
| pbw[1] | — | — | — | — | — | — | — | — | — |
| equiv.[3] | — | — | — | — | — | — | — | — | — |
| BEHENIC ACID, | | | | | | | | | |
| pbw[1] | — | — | — | — | — | — | — | — | — |
| ahe[2] | — | — | — | — | — | — | — | — | — |
| STEARIC ACID, | | | | | | | | | |
| pbw[1] | 2 | — | — | — | — | — | — | — | — |
| ahe[2] | 0.008 | — | — | — | — | — | — | — | — |
| OLEIC ACID, | | | | | | | | | |
| pbw[1] | — | 2 | — | — | — | — | — | — | — |
| equiv.[3] | — | 0.008 | — | — | — | — | — | — | — |
| ISOSTEARIC ACID, | | | | | | | | | |
| pbw[1] | — | — | 2 | — | — | — | — | — | — |
| equiv.[3] | — | — | 0.008 | — | — | — | — | — | — |
| BENZOIC ACID, | | | | | | | | | |
| pbw[1] | — | — | — | 2 | — | — | — | — | — |
| equiv.[3] | — | — | — | 0.016 | — | — | — | — | — |
| ACETIC ACID, | | | | | | | | | |
| pbw[1] | — | — | — | — | 0.33 | — | — | — | — |
| equiv.[3] | — | — | — | — | 0.0055 | — | — | — | — |
| TALLOIL SARCOSINE, | | | | | | | | | |
| pbw[1] | | | | | | | — | 2 | — |
| equiv.[3] | | | | | | | — | unknown | — |
| ISOOLEOYL SARCOSINE, | | | | | | | | | |
| pbw[1] | | | | | | | — | — | 2 |
| equiv.[3] | | | | | | | — | — | 0.0057 |
| COCOYL GLYCINE, | | | | | | | | | |
| pbw[1] | | | | | | | — | — | 2 |
| equiv.[3] | | | | | | | — | — | unknown |
| POLYISOCYANATE A, | | | | | | | | | |
| pbw[1] | 152 | 152 | 152 | 152 | 152 | 147 | 152 | 152 | 152 |
| equiv.[3] | 1.063 | 1.063 | 1.063 | 1.063 | 1.063 | 1.028 | 1.063 | 1.063 | 1.063 |
| REACTIVITY TIME, | | | | | | | | | |
| cream, sec. | 27 | 13 | 19 | 12 | 11 | 20 | 9 | 7 | 16 |
| cure, sec. | 40 | 21 | 24 | 22 | 15 | 25 | 15 | 14 | 22 |
| RELEASE VALUE | 6 | 8 | 6 | 6 | 6 | 4 | 9 | 9 | 8 |

Example 3

The general procedure was employed using various components. The compositions and results are provided in Table III.

TABLE III

| COMPONENT AND RESULTS | EXPERIMENT LETTER[20] | | | | | | |
|---|---|---|---|---|---|---|---|
| | A | B | C | D | E | F | G |
| POLYOL B, | | | | | | | |

TABLE III-continued

| | | | | | | | |
|---|---|---|---|---|---|---|---|
| pbw[1] | 92.5 | 92.5 | 92.5 | 92.5 | 92.5 | 92.5 | 92.5 |
| ahe[2] | 0.057 | 0.057 | 0.057 | 0.057 | 0.057 | 0.057 | 0.057 |
| POLYETHERAMINE A, | | | | | | | |
| pbw[1] | 7.5 | 7.5 | 7.5 | 7.5 | 7.5 | 7.5 | 7.5 |
| ahe[2] | 0.075 | 0.075 | 0.075 | 0.075 | 0.075 | 0.075 | 0.075 |
| POLYOL C, | | | | | | | |
| pbw[1] | 30 | 30 | 30 | 30 | 30 | 30 | 30 |
| ahe[2] | 0.967 | 0.967 | 0.967 | 0.967 | 0.967 | 0.967 | 0.967 |
| OLEOYL SARCOSINE, | | | | | | | |
| pbw[1] | 2 | 2 | 2 | 2 | 2 | 2 | 2 |
| equiv.[3] | 0.0057 | 0.0057 | 0.0057 | 0.0057 | 0.0057 | 0.0057 | 0.0057 |
| METAL CARBOXYLATE, | | | | | | | |
| TYPE | ZnSt[4] | MgSt[5] | CaSt[6] | AlMSt[7] | AlDSt[8] | AlTSt[9] | LiSt[10] |
| pbw[1] | 2 | 2 | 2 | 2 | 2 | 2 | 2 |
| POLYISOCYANATE A, | | | | | | | |
| pbw[1] | 152 | 152 | 152 | 152 | 152 | 152 | 152 |
| equiv.[3] | 1.063 | 1.063 | 1.063 | 1.063 | 1.063 | 1.063 | 1.063 |
| REACTIVITY TIME, | | | | | | | |
| cream, sec. | 7 | 19 | 20 | 30 | 30 | 35 | 29 |
| cure, sec. | 12 | 24 | 24 | 36 | 34 | 45 | 34 |
| RELEASE VALUE | 9 | 9 | 8 | 5 | 3 | 9 | 9 |

| COMPONENT AND RESULTS | EXPERIMENT LETTER[20] | | | | | | |
|---|---|---|---|---|---|---|---|
| | H | I | J | K | L | M | N |
| POLYOL B, | | | | | | | |
| pbw[1] | 92.5 | 92.5 | 92.5 | 92.5 | 92.5 | 92.5 | 92.5 |
| ahe[2] | 0.057 | 0.057 | 0.057 | 0.057 | 0.057 | 0.057 | 0.057 |
| POLYETHERAMINE A, | | | | | | | |
| pbw[1] | 7.5 | 7.5 | 7.5 | 7.5 | 7.5 | 7.5 | 7.5 |
| ahe[2] | 0.075 | 0.075 | 0.075 | 0.075 | 0.075 | 0.075 | 0.075 |
| POLYOL C, | | | | | | | |
| pbw[1] | 30 | 30 | 30 | 30 | 30 | 30 | 30 |
| ahe[2] | 0.967 | 0.967 | 0.967 | 0.967 | 0.967 | 0.967 | 0.967 |
| OLEOYL SARCOSINE, | | | | | | | |
| pbw[1] | 2 | 2 | 2 | 2 | 2 | 2 | 2 |
| equiv.[3] | 0.0057 | 0.0057 | 0.0057 | 0.0057 | 0.0057 | 0.0057 | 0.0057 |
| METAL CARBOXYLATE, | | | | | | | |
| TYPE | NaSt[11] | KSt[12] | CdSt[13] | NiSt[21] | FeSt[22] | BaSt[23] | CuSt[24] |
| pbw[1] | 2 | 2 | 2 | 2 | 2 | 2 | 2 |
| POLYISOCYANATE A, | | | | | | | |
| pbw[1] | 152 | 152 | 152 | 152 | 152 | 152 | 152 |
| equiv.[3] | 1.063 | 1.063 | 1.063 | 1.063 | 1.063 | 1.063 | 1.063 |
| REACTIVITY TIME, | | | | | | | |
| cream, sec. | 15 | 16 | 15 | 16 | 30 | 20 | 12 |
| cure, sec. | 18 | 20 | 18 | 25 | 45 | 30 | 18 |
| RELEASE VALUE | 9 | 7 | 5 | 9 | 9 | 9 | 9 |

Example 4

The general procedure was employed using various components. The components except the isocyanate were blended together and stored for various periods of time at 23° C. prior to mixing with the polyisocyanate and molding. The compositions and results are provided in the following Table IV.

TABLE IV

| COMPONENT AND RESULTS | EXPERIMENT LETTER[20] | | | | | | | |
|---|---|---|---|---|---|---|---|---|
| | A* | B* | C* | D | E | F* | G* | H* |
| POLYOL B, | | | | | | | | |
| pbw[1] | 92.5 | 92.5 | 92.5 | 92.5 | 92.5 | 92.5 | 92.5 | 92.5 |
| ahe[2] | 0.057 | 0.057 | 0.057 | 0.057 | 0.057 | 0.057 | 0.057 | 0.057 |
| POLYETHERAMINE A, | | | | | | | | |
| pbw[1] | 7.5 | 7.5 | 7.5 | 7.5 | 7.5 | 7.5 | 7.5 | 7.5 |
| ahe[2] | 0.075 | 0.075 | 0.075 | 0.075 | 0.075 | 0.075 | 0.075 | 0.075 |
| POLYOL C, | | | | | | | | |
| pbw[1] | 18 | 18 | 18 | 18 | 18 | 18 | 18 | 18 |
| ahe[2] | 0.58 | 0.58 | 0.58 | 0.58 | 0.58 | 0.58 | 0.58 | 0.58 |
| OLEOYL SARCOSINE, | | | | | | | | |
| pbw[1] | — | 2 | — | 2 | — | 4 | — | — |
| equiv.[3] | — | 0.005 | — | 0.0057 | — | 0.011 | — | — |
| OLEIC ACID, | | | | | | | | |
| pbw[1] | — | — | 2 | — | 2 | — | 4 | — |
| equiv.[3] | — | — | 0.008 | — | 0.008 | — | 0.014 | — |
| ZINC STEARATE, pbw[1] | — | — | — | 2 | 2 | — | — | 4 |
| UL 28 CATALYST, pbw[1] | 0.05 | 0.05 | 0.05 | 0.05 | 0.05 | 0.05 | 0.05 | 0.05 |
| POLYISOCYANATE A, | | | | | | | | |
| pbw[1] | 96.4 | 96.4 | 96.4 | 96.4 | 96.4 | 96.4 | 96.4 | 96.4 |

TABLE IV-continued

| COMPONENT AND RESULTS | EXPERIMENT LETTER[20] | | | | | | | |
|---|---|---|---|---|---|---|---|---|
| | A* | B* | C* | D | E | F* | G* | H* |
| equiv.[3] | 0.067 | 0.067 | 0.067 | 0.067 | 0.067 | 0.067 | 0.067 | 0.067 |
| 0 Hours Storage REACTIVITY TIME, | 10 | 22 | 25 | 10 | 15 | 33 | 37 | 15 |
| cream, sec. | 15 | 30 | 35 | 15 | 25 | 47 | 49 | 17 |
| cure, sec. | 0 | 2 | 4 | 9 | 9 | 5 | 7 | 0 |
| RELEASE VALUE | | | | | | | | |
| 24 Hours Storage REACTIVITY TIME, | 22 | 65 | 55 | 10 | 25 | 90 | 90 | 15 |
| cream, sec. | 30 | 90 | 90 | 15 | 45 | 120 | 120 | 20 |
| cure, sec. | 0 | 0 | 2 | 9 | 9 | 0 | 0 | 0 |
| RELEASE VALUE | | | | | | | | |
| 72 Hours Storage REACTIVITY TIME, | 20 | 55 | 45 | 10 | 18 | 90 | 90 | 13 |
| cream, sec. | 30 | 90 | 90 | 15 | 45 | ∞ | 120 | 20 |
| cure, sec. | 0 | 2 | 2 | 9 | 9 | 0 | 0 | 0 |
| RELEASE VALUE | | | | | | | | |
| 312 Hours Storage REACTIVITY TIME, | 25 | 60 | 50 | 17 | 18 | 90 | 90 | 17 |
| cream, sec. | 30 | 90 | 90 | 25 | 45 | ∞ | ∞ | 25 |
| cure, sec. | 0 | 0 | 2 | 9 | 9 | 0 | 0 | 0 |
| RELEASE VALUE | | | | | | | | |

Example 5

This example employed a production model (Krauss Maffei PU 40) reaction injection molding machine. The composition and results are given in the following Table V. The mold was a Steel Plaque Tool, 22"×26"×⅛"(55.88 cm×66.04 cm×0.3175 cm). The conditions employed were as follows:

| B-Side | |
|---|---|
| Temperature | 115° F.–120° C. (46.1° C.–48.8° C.) |
| Injection Pressure A-Side | 150 bars (150 kPa) |
| Temperature | 120° F. (48.8° C.) |
| Injection Pressure | 150 bars (150 kPa) |
| Injection Rate | ~150 lb/min (1134 g/s) |
| Shot Time | 1.5–2 secs |
| Mold Temperature | 150° F.–170° F. (65.5° C.–76.6° C.) |
| Demold Time | 60 secs |
| Post Cure, Time/Temp | 30 min/250° F. (1800 s/121.1° C.) |

The components and results are provided in the following Table V.

TABLE V

| COMPONENT AND RESULTS | EXPERIMENT LETTER[20] | | | | | | | | |
|---|---|---|---|---|---|---|---|---|---|
| | A* | B* | C* | D | E* | F* | G | H | I |
| POLYOL B, | | | | | | | | | |
| pbw[1] | 92.5 | 92.5 | 92.5 | 92.5 | 92.5 | 92.5 | 92.5 | 92.5 | 92.5 |
| ahe[2] | 0.057 | 0.057 | 0.057 | 0.057 | 0.057 | 0.057 | 0.057 | 0.057 | 0.057 |
| POLYETHERAMINE A, | | | | | | | | | |
| pbw[1] | 7.5 | 7.5 | 0 | 7.5 | 7.5 | 7.5 | 7.5 | 7.5 | 7.5 |
| ahe[2] | 0.075 | 0.075 | 0 | 0.075 | 0.075 | 0.075 | 0.075 | 0.075 | 0.075 |
| POLYOL C, | | | | | | | | | |
| pbw[1] | 18 | 18 | 18 | 18 | 18 | 18 | 18 | 18 | 18 |
| ahe[2] | 0.58 | 0.58 | 0.58 | 0.58 | 0.58 | 0.58 | 0.58 | 0.58 | 0.58 |
| OLEOYL SARCOSINE, | | | | | | | | | |
| pbw[1] | — | — | — | — | — | — | 3 | — | 2 |
| equiv.[3] | — | — | — | — | — | — | 0.008 | — | 0.057 |
| OLEIC ACID, | | | | | | | | | |
| pbw[1] | — | 4 | 3 | — | 3 | 3.3 | — | 3 | — |
| equiv.[3] | — | 0.014 | 0.011 | — | 0.011 | 0.012 | — | 0.011 | — |
| DETA[14], | | | | | | | | | |
| pbw[1] | — | — | 2 | — | — | — | — | — | — |
| ahe[2] | — | — | 0.097 | — | — | — | — | — | — |
| EDA[15], | | | | | | | | | |
| pbw[1] | — | — | — | — | — | 0.7 | — | — | — |
| ahe[2] | — | — | — | — | — | 0.047 | — | — | — |
| DEA[16], | | | | | | | | | |
| pbw[1] | — | — | — | — | 1.8 | — | — | — | — |
| ahe[2] | — | — | — | — | 0.051 | — | — | — | — |
| SODIUM OLEATE, pbw[1] | — | — | — | 1 | — | — | — | — | — |
| ZINC STEARATE, pbw[1] | — | — | — | — | — | — | 1 | 1 | 2 |
| UL 28 CATALYST, pbw[1] | 0.2 | 0.7 | 0.8 | 0.2 | 0.4 | 0.4 | 0.2 | 0.2 | 0.2 |
| POLYISOCYANATE A, | | | | | | | | | |
| pbw[1] | 99.3 | 99.3 | 99.3 | 99.3 | 99.3 | 99.3 | 99.3 | 99.3 | 99.3 |
| equiv.[3] | 0.694 | 0.694 | 0.694 | 0.694 | 0.694 | 0.694 | 0.694 | 0.694 | 0.694 |
| TENSILE STRENGTH, | | | | | | | | | |
| psi | 3700 | 3800 | 3300 | 2600 | 3300 | 3900 | 3300 | 3200 | 3400 |

TABLE V-continued

| COMPONENT AND RESULTS | EXPERIMENT LETTER[20] | | | | | | | | |
|---|---|---|---|---|---|---|---|---|---|
| | A* | B* | C* | D | E* | F* | G | H | I |
| MPa | 25.5 | 26.2 | 22.7 | 17.9 | 22.7 | 26.9 | 22.7 | 22.1 | 23.4 |
| ELONGATION, % | 240 | 155 | 165 | 105 | 180 | 195 | 220 | 260 | 240 |
| NO. OF RELEASES[18] | 2 | 18 | 22 | 22 | 18 | 2 | 23 | 23 | 30+ |

Example 6

This example employed a different RIM production machine (Cincinnati Milicron RIM-90) and an actual prototype part. The conditions employed were as follows:

| B-Side | |
|---|---|
| Temperature | 95° F. (35° C.) |
| Injection Pressure | 1800–2100 psi (12.4–14.5 MPa) |
| A-Side | |
| Temperature | 80° F. (26.7° C.) |
| Injection Pressure | 1600–1900 psi (11–13.1 MPa) |
| Injection Rate | 6.0–3.5 lb/sec (2.7–1.6 kg/s) |
| Shot Time | 1.8–3.1 secs |
| Mold Temperature | 130° F.–155° F. (54.4° C.–68.3° C.) |
| Demold Time | 30–60 secs |
| Post Cure, Time/Temp | 60 min/250° F. (3600 s/121.1° C.) |

The plaque mold was constructed of P-20 tool steel. The mold surface was cleaned using "Slide Mold Cleaner" (commercially available from Percy Harms Corp.). No subsequent treatment was made prior to molding.

The components and results are provided in the following Table VI.

TABLE VI

| COMPONENT AND RESULTS | EXPERIMENT LETTER[20] | | | |
|---|---|---|---|---|
| | A | B | C | D* |
| POLYOL B, | | | | |
| pbw[1] | 92.5 | 92.5 | 92.5 | 92.5 |
| ahe[2] | 0.057 | 0.057 | 0.057 | 0.057 |
| POLYETHERAMINE A, | | | | |
| pbw[1] | 7.5 | 7.5 | 0 | 7.5 |
| ahe[2] | 0.075 | 0.075 | 0 | 0.075 |
| DETDA[17], | | | | |
| pbw[1] | 18 | 20 | 22 | 22 |
| ahe[2] | 0.404 | 0.449 | 0.494 | 0.494 |
| OLEOYL SARCOSINE, | | | | |
| pbw[1] | 2 | 2 | 2 | — |
| equiv.[3] | 0.0057 | 0.0057 | 0.0057 | — |
| ZINC STEARATE, pbw[1] | 2 | 2 | 2 | — |
| POLYISOCYANATE B, | | | | |
| pbw[1] | 54.7 | 58.9 | 63.1 | 63.1 |
| equiv.[3] | 0.303 | 0.326 | 0.350 | 0.350 |
| NO. OF RELEASES[18] (BARE METAL) | 35+ | 35+ | 35+ | 0 |
| CONSECUTIVE[19] (BARE METAL) | 35+ | 70+ | 105+ | — |
| TENSILE STRENGTH, | | | | |
| psi | 2800 | 2800 | 3100 | — |
| MPa | 19.3 | 19.3 | 21.4 | — |
| ELONGATION, % | 230 | 240 | 240 | — |
| DIE C TEAR STRENGTH, | | | | |
| pli | 500 | 500 | 500 | — |
| kg/m | 8928.5 | 8928.5 | 8928.5 | — |
| FLEXURAL MODULUS, | | | | |
| psi | 26000 | 30000 | 38000 | — |
| MPa | 179.1 | 106.7 | 261.8 | — |

TABLE VI-continued

| COMPONENT AND RESULTS | EXPERIMENT LETTER[20] | | | |
|---|---|---|---|---|
| | A | B | C | D* |

FOOTNOTES TO TABLES I–VI
[1] pbw = parts by weight
[2] ahe = active hydrogen equivalents (pbw ÷ (molecular weight ÷ number of hydrogen atoms attached to either an oxygen atom or a nitrogen atom)
[3] equiv. = equivalents
[4] ZnSt = zinc stearate
[5] MgSt = magnesium stearate
[6] CaSt = calcium stearate
[7] AlMSt = aluminum monostearate
[8] AlDSt = aluminum distearate
[9] AlTSt = aluminum tristearate
[10] LiSt = lithium stearate
[11] NaSt = sodium stearate
[12] KSt = potassium stearate
[13] CdSt = cadmium stearate
[14] DETA = diethylenetriamine
[15] EDA = ethylenediamine
[16] DEA = diethanolamine
[17] DETDA = diethylenetoluenediamine
[18] NO. OF RELEASES = number of consecutive releases. The run for the example was stopped after the indicated no. of parts were made with no mold sticking being observed.
[19] CONSECUTIVE = consecutive releases including previous experiments, which were tested. No mold sticking was observed.
[20] The experiment letters containing an asterisk (*) are comparative experiments whereas those without an asterisk (*) are examples of the present invention.
[21] NiSt = nickel stearate
[22] FeSt = ferrous stearate
[23] BaSt = barium stearate
[24] CuSt = cupric stearate Comparative Experiment A "B-Side" Formulation 93 parts by weight Polyol B
7 parts by weight Polyetherdiamine A
18 parts by weight Diamine A Preparation Polyol B (93 lb, 421,848 kg) was weighed into the polyol tank of an Admiral reaction injection molding machine, to it was then added 7 lb (3.28 kg) of Polyetheramine A and 18 lb (8.17 kg) of Diamine A. The tank was then closed and pressured (9 psi, 62 kPa) with dry nitrogen. The stirrer in the tank was turned on, then the low pressure pump, and then the high pressure pump. The fluid was allowed to circulate till a homogeneous solution was obtained, about 40 minutes (2400 s). The system was catalyzed by the addition of 0.1 percent by weight of the B side of each of the following catalysts, Catalyst A and Catalyst B.

The machine was calibrated to give an index of 105 with a "B-side"/"A-side" weight ratio of 1.87 using polyisocyanate B as the "A-side" component.

Sample plaques were prepared under the following conditions. The shot time was 2 seconds and the demold time was 60 seconds.

| | Polyol (B side) | Isocyanate (A side) |
|---|---|---|
| Injection pressure, psi | 2000 | 2000 |
| kPa | 13790 | 13790 |
| Component Temp. °F./°C. | 100/37.8 | 100/37.8 |

| | Polyol (B side) | Isocyanate (A side) |
|---|---|---|
| Mold Temp. °F./°C. | 150/65.6 | 150/65.6 |

The parts were shot into a chrome steel plaque mold which made a plaque 14"×12"×⅛"(35.56 cm×30.48 cm x 0.3175 cm) and weighed approximately 470 g.

Mold Preparation

Before any parts were shot the mold was meticulously cleaned with a propriatory mold cleaner and all traces of previous polymer removed. The mold was then dried and polished. There was no further preparation of the mold.

Results

Part 1. The plaque released from the mold with a slight pull.

Part 2. A strong pull was required to pull the plaque from the mold.

Part 3. The plaque stuck to the mold, and was removed with great difficulty. The plaque tore and parts were left adhering to the mold. This was quite unsatisfactory.

Example 7

"B-side" Formulation 93 parts by weight Polyol B
7 parts by weight Polyetheramine A
18 parts by weight Diamine A
2.5 parts by weight zinc stearate Preparation Polyol B (63 lb, 28.58 kg) were weighed into a stainless steel, 25-gallon vessel equipped with heating and stirring. To it was added 7 lb (3.18 kg) Polyetheramine A and 2.5 lb (1.134 kg) of zinc stearate. The mixture was heated to about 85° C. with stirring for about 45 minutes (2700 s), after which time a slightly cloudy solution was obtained. The fluid was transferred to the polyol tank of an Admiral reaction injection molding machine, and the remainder of Polyol B, 30 lb (13.608 kg) was added along with 18 lb (8.17 kg) of Diamine A. The tank was closed, pressurized and recirculated as described in Comparative Experiment A. The system was then catalyzed as in Comparative Experiment A. The machine conditions and "B-side"/"A-side" ratio, index, and isocyanate were the same as in Comparative Experiment A as was the preparation of the mold.

Results

Parts 1 through 16 were prepared and removed from the mold with no evidence of sticking or adhesion to the mold. The surface of the finished plaques was excellent. The trial was arbitrarily concluded at Part 16.

Example 8

The formulation of Example 7 was changed by substituting 2.5 lb (1.134 kg) of zinc laurate for the 2.5 lb (1.134 kg) of zinc stearate. Method of preparation and all other conditions as in Example 1.

Results

Parts 1 through 19 were prepared and removed from the mold with no evidence of sticking or adhesion. The trial was arbitrarily concluded at Part 19.

Example 9

Using the method of preparation and machine condition as in Example 7, but using 0.5 lb (0.2268 kg) of zinc stearate.

Results

Parts 1 through 15 were obtained without sticking or adhesion. The trial was arbitrarily concluded at Part 15.

Example 10

Method of preparation and all other conditions as in Example 7 except that 6 lb (2.7216 kg) zinc stearate were added rather than 2.5 lb (1.134 kg) zinc stearate.

Results

Parts 1 through 16 were produced without sticking or adhesion to the mold, arbitrarily concluded at Part 16.

Comparative Experiment B

"B-side" Formulation 93 parts by weight Polyol B
7 parts by weight Polyetheramine A
18 parts by weight ethylene glycol Preparation The system was prepared as in Comparative Experiment A, except that ethylene glycol (polyol C) was used in place of Diamine A.

Polyisocyanate A was employed as the "A-side" component at an index of 103. Catalysts as described in Comparative Experiment A were employed. Machine conditions as in Comparative Experiment A were employed. Mold preparation as in Comparative Experiment A were employed.

Results

Part 1. Part released from mold.
Part 2. Massive adhesion, surface of part was ruined.

Example 11

Formulation as in Comparative Experiment B with the addition of 2.5 lb (1.134 kg) zinc stearate.

Method of Preparation as in Example 7 except that Polyol C (ethylene glycol) was used instead of Diamine A.

Machine conditions and isocyanate used as in Comparative Experiment B. Mold preparation was as previously described.

Results

Parts 1-12 were prepared with no sticking or adhesion to the mold. The testing was arbitrarily concluded after Part 12.

Example 12

An experiment was conducted employing an Admiral 400-2HP RIM machine and a stainless steel plaque mold measuring 12 in.×14 in.×⅛ in. (30.48 cm×35.56 cm×0.3175 cm). The mold was not treated prior to use. The compositions and conditions were as follows:

Polyisocyanate (A-side)

Polyisocyanate B was employed in a quantity which provided an NCO Index of 103.

Polyol (B-side)

50 pbw Polyetheramine C
50 pbw mixture of 93 wt. percent Polyol B and 7 wt. percent Polyetheramine A
18 pbw Diamine A
0 or 2 pbw zinc stearate
0.05 wt. percent triethylenediamine catalyst (33 wt. percent solution in dipropylene glycol)
0.05 wt. percent dibutyl tin dilaurate (T-12 from M&T Chemical)

Conditions

A/B weight ratio—0.465/1
116° F./46.7° C.—temperature of reactants
2400 psig/16548 kPa—injection pressure
145° F./62.8° C.—mold temperature
60 seconds—demold time

Results

Prior to the addition of the zinc stearate to the polyol (B-side), several plaques were made. These plaques required considerable effort to obtain release of the plaque from the mold. After addition of the zinc stearate to the polyol (B-side) formulation, 17 parts were made with no indication of sticking or polymer buildup before the polyol (B-side) ran low on material causing the experiment to be terminated. Some of these parts literally fell out of the mold upon opening of the mold.

Example 13

An experiment was conducted employing an Admiral 400-2HP RIM machine and a stainless steel plaque mold measuring 12 in.×14 in.×⅛ in. (30.48 cm×35.56 cm×0.3175 cm). The mold was treated with external mold release on one side of the mold. After the seventh sample, the external mold release was stripped from that side so that the entire mold was bare steel.

The composition and conditions were as follows:

Polyisocyanate (A-side)

Polyisocyanate B was employed.

Polyol (B-side)

100 pbw Polyol B
25 pbw Diamine A
2 pbw zinc stearate
2 pbw oleoyl sarcosine
0.1 wt. percent catalyst A
0.1 wt. percent catalyst B

Conditions

A/B weight ratio was 0.5/1.
Temperature of the reactants was 100° F. (37.8° C.).
Temperature of the mold was 140° F. (60° C.).
Injection pressure was 2000 psig (13790 kPa).
Demold time wa 60 seconds.

The formulation provided good samples off one bare steel face and 10 releases off both bare steel faces.

We claim:

1. An active hydrogen-containing composition comprising
   (A) a material having an average of at least about 2 active hydrogen-containing groups per molecule and a weight from about 500 to about 5000 per active hydrogen-containing group, said composition having dissolved therein
   (B) from about 0.5 to about 10 parts by weight per 100 parts by weight of component (A) of a metal salt of an organic material containing at least one carboxylic acid group and a saturated or unsaturated aliphatic hydrocarbon chain having at least about 7 carbon atoms wherein said metal is selected from Groups I-B, II-B, III-A, IV-B, V-B, VI-B, VII-B or VIII of the Periodic Table of the Elements, Sn, Pb, Sb or Bi:
   said composition containing a sufficient quantity of at least one aliphatic primary and/or secondary amine-containing material such that component (B) is soluble in said composition, wherein
   said composition is devoid of an organic material containing at least one carboxylic acid group, phosphorus-containing acid group or boron-containing acid group or mixture of such materials wherein said organic material contains a siloxane chain or contains at least one terminal or pendant saturated or unsaturated aliphatic hydrocarbon chain containing at least about 7 carbon atoms.

2. The composition of claim 1 wherein component (B) is represented by the structure

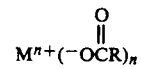

wherein M represents the metal, R represents an organic group containing a terminal or pendant saturated or unsaturated aliphatic hydrocarbon chain containing at least about 7 carbon atoms, and n is equal to the valance of the metal.

3. The composition of claim 2 wherein component (A) comprises an amine-terminated polymer or copolymer of propylene oxide.

4. The composition of claim 3 wherein the metal is zinc.

5. The composition of claim 4 which further comprises a relatively low equivalent weight material having a plurality of hydroxyl, primary aromatic amine or secondary aromatic amine groups or a mixture of such groups and an active hydrogen equivalent weight of from about 15 to about 500.

6. The composition of claim 5 wherein said relatively low equivalent weight material comprises an aromatic amine.

7. The composition of claim 6 wherein said aromatic amine is 1-methyl-3,5-diethyl-2,6-diaminobenzene or 1-methyl-3,5-diethyl-2,4-diaminobenzene or mixture thereof.

8. The composition of claim 7 wherein component (B) is zinc stearate, zinc oleate or zinc laurate.

9. The composition of claim 2 wherein component (A) comprises a hydroxyl-terminated polymer or copolymer of propylene oxide, and said composition further comprises a relatively low equivalent weight material having a plurality of hydroxyl, primary aromatic amine or secondary aromatic amine groups or a mixture of such groups and an active hydrogen equivalent weight of from about 15 to about 500.

10. The composition of claim 9 wherein the metal is zinc.

11. The composition of claim 10 wherein said relatively low equivalent weight material comprises an aromatic amine.

12. The composition of claim 11 wherein said metal salt of the carboxylic acid has from 10 to 20 carbon atoms.

13. The composition of claim 12 wherein said aliphatic primary or secondary amine-containing material comprises an aminated polyoxypropylene glycol having an active hydrogen equivalent weight up to about 500.

14. The composition of claim 13 wherein said aromatic amine is 1-methyl-3,5-diethyl-2,6-diaminobenzene or 1-methyl-3,5-diethyl-2,4-diaminobenzene.

15. The composition of claim 14 wherein component (B) is zinc stearate, zinc oleate or zinc laurate.

16. An active hydrogen-containing composition comprising
(A) a material having an average of at least about 2 active hydrogen-containing groups per molecule and a weight per active hydrogen-containing group from about 500 to about 5000, said composition having dissolved therein
(B) from about 0.5 to about 10 parts by weight per 100 parts by weight component (A) of a metal salt of an organic material containing at least one carboxylic acid group and a saturated or unsaturated aliphatic hydrocarbon chain having at least about 7 carbon atoms, wherein said metal is selected from Groups I-B, II-B, IV-B, V-B, VI-B, VII-B or VIII of the Periodic Table of the Elements;
said composition containing a sufficient quantity of at least one primary and/or secondary amine-containing material such that component (B) is soluble in said composition, wherein
said composition is devoid of an organic material containing at least one carboxylic acid group, phosphorus-containing acid group or boron-containing acid group or mixture of such materials wherein said organic material contains a siloxane chain or contains at least one terminal or pendant saturated or unsaturated aliphatic hydrocarbon chain containing at least about 7 carbon atoms.

17. The composition of claim 16 wherein component (B) is represented by the structure

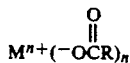

wherein M represents the metal, R represents an organic group containing a terminal or pendant saturated or unsaturated aliphatic hydrocarbon chain containing at least about 7 carbon atoms, and n is equal to the valance of the metal.

18. The composition of claim 17 wherein component (A) is a polymer or copolymer of propylene oxide.

19. The composition of claim 18 said primary or secondary amine containing material comprises an aromatic diamine.

20. The composition of claim 19 wherein the metal is zinc.

21. The composition of claim 20 wherein said polymer or copolymer of propylene oxide is hydroxylterminated.

22. The composition of claim 21 wherein the metal salt of the carboxylic acid contains from 10 to 20 carbon atoms.

23. An active hydrogen-containing composition comprising
(A) a material having an average of at least about 2 active hydrogen-containing groups per molecule and a weight from about 500 to about 5000 per active hydrogen-containing group, said composition having dissolved therein
(B) from about 0.5 to about 10 parts by weight per 100 parts by weight of component (A) of a metal salt of an organic material containing at least one carboxylic acid group and a saturated or unsaturated aliphatic hydrocarbon chain having at least about 7 carbon atoms wherein said metal is selected from Groups I-B, II-B, III-A, IV-B, V-B, VI-B, VII-B or VIII of the Periodic Table of the Elements, Sn, Pb, Sb or Bi:
said composition containing a sufficient quantity of at least one aliphatic primary and/or secondary amine-containing material such that component (B) is soluble in said composition
said composition further comprising (C) an organic material containing at least one carboxylic acid group, phosphorus-containing acid group or boron-containing acid group or mixture of such materials wherein said organic material contains a siloxane chain or contains at least one terminal or pendant saturated or unsaturated aliphatic hydrocarbon chain containing at least about 7 carbon atoms.

24. The composition of claim 23 wherein component (B) is represented by the structure

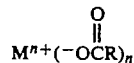

wherein M represents the metal, R represents an organic group containing a terminal or pendant saturated or unsaturated aliphatic hydrocarbon chain containing at least about 7 carbon atoms, and n is equal to the valance of the metal.

25. The composition of claim 24 wherein component (A) comprises an amine-terminated polymer or copolymer of propylene oxide.

26. The composition of claim 25 wherein the metal is zinc.

27. The composition of claim 26 which further comprises a relatively low equivalent weight material having a plurality of hydroxyl, primary aromatic amine or secondary aromatic amine groups or a mixture of such groups and an active hydrogen equivalent weight of from about 15 to about 500.

28. The composition of claim 27 wherein said relatively low equivalent weight material comprises an aromatic amine.

29. The composition of claim 28 wherein said aromtaic amine is 1-methyl-3,5-diethyl-2,6-diaminobenzene or 1-methyl-3,5-diethyl-2,4-diaminobenzene.

30. The composition of claim 29 wherein component (B) is zinc stearate, zinc oleate or zinc laurate.

31. The composition of claim 24 wherein component (A) comprises a hydroxyl-terminated polymer or copolymer of propylene oxide, and said composition further comprises a relatively low equivalent weight material having a plurality of hydroxyl, primary aromatic amine or secondary aromatic amine groups or a mixture of such groups and an active hydrogen equivalent weight of from about 15 to about 500.

32. The composition of claim 31 wherein the metal is zinc.

33. The composition of claim 32 wherein said relatively low equivalent weight material comprises an aromatic amine.

34. The composition of claim 33 wherein the metal salt of the carboxylic acid has from 10 to 20 carbon atoms.

35. The composition of claim 34 wherein said aliphatic primary or secondary amine-containing material comprises an aminated polyoxypropylene glycol having an active hydrogen equivalent weight up to about 500.

36. The composition of claim 35 wherein said aromatic amine is 1-methyl-3,5-diethyl-2,6-diaminobenzene or 1-methyl-3,5-diethyl-2,4-diaminobenzene.

37. The composition of claim 36 wherein component (B) is zinc stearate, zinc oleate or zinc laurate.

38. An active hydrogen-containing composition comprising
(A) material having an average of at least about 2 active hydrogen-containing groups per molecule and a weight per active hydrogen-containing group from about 500 to about 5000, said composition having dissolved therein
(B) from about 0.5 to about 10 parts by weight per 100 parts by weight of component (A) of a metal salt of an organic material containing at least one carboxylic acid group and a saturated or unsaturated aliphatic hydrocarbon chain having at least about 7 carbon atoms, wherein said metal is selected from Groups I-B, II-B, IV-B, V-B, VI-B, VII-B or VIII of the Periodic Table of the Elements;
said composition containing a sufficient quantity of at least one primary and/or secondary amine-containing material such that component (B) is soluble in said composition and
(C) an organic material containing at least one carboxylic acid group, phosphorus-containing acid group or boron-containing acid group or mixture of such materials wherein said organic material contains a siloxane chain or contains at least one terminal or pendant saturated or unsaturated aliphatic hydrocarbon chain containing at least about 7 carbon atoms.

39. The composition of claim 38 wherein component (B) is represented by the structure

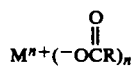

wherein M represents the metal, R represents an organic group containing a terminal or pendant saturated or unsaturated aliphatic hydrocarbon chain containing at least about 7 carbon atoms, and n is equal to the valance of the metal.

40. The composition of claim 39 wherein component (A) is a polymer or copolymer of propylene oxide.

41. The composition of claim 40 wherein said primary or secondary amine-containing material comprises an aromatic diamine.

42. The composition of claim 41 wherein the metal is zinc.

43. The composition of claim 42 wherein said polymer or copolymer of propylene oxide is hydroxylterminated.

44. The composition of claim 43 wherein the metal salt of the carboxylic acid has from 10 to 20 carbon atoms.

45. An active hydrogen-containing composition comprising
(I) a polyether polyol terminated in primary or secondary hydroxyl groups and having a hydroxyl equivalent weight of from about 100 to about 2500: and
(II) an internal mold release composition which comprises
(A) a metal salt of a carboxylic acid having a terminal or pendant saturated or unsaturated aliphatic hydrocarbon chain having at least seven carbon atoms attached to a carbonyl group and from about 10 to 29 carbon atoms per molecule, wherein said metal is a member of Group II-B of the Periodic Table of Elements, aluminum, copper, iron, cobalt or nickel:
(B) a material containing at least one aliphatic primary amine group and/or at least one aliphatic secondary amine group per molecule or a mixture of such materials: and
(C) a monocarboxylic acid having from about 10 to about 29 carbon atoms per molecule: and wherein the components are employed in quantities such that
(i) the weight ratio of components (II-C):(II-A) is from about 0.3:1 to about 3:1; and
(ii) components (II-C) and (II-B) are employed in quantities which provide from about 0.04 to about 2 equivalents of component (II-C) per amine nitrogen equivalent of component (II-B):
(iii) and the composition contains from about 0.5 to about 20 parts of component (II-A) per 100 parts by weight component (I).

46. The composition of claim 45 wherein
(i) component (I) is a glycerine initiated polyoxypropylene glycol capped with ethylene oxide such that about 50 percent of the hydroxyl groups are primary hydroxyl groups:
(ii) component (II-A) is zinc stearoyl sarcosinate, zinc oleoyl sarcosinate, zinc palmitoyl sarcosinate, zinc lauroyl sarcosinate, copper stearoyl sarcosinate, copper oleoyl sarcosinate, copper palmitoyl sarcosinate, copper lauroyl sarcosinate, nickel stearoyl sarcosinate, nickel oleoyl sarcosinate, nickel palmitoyl sarcosinate, nickel lauroyl sarcosinate or mixture thereof:
(iii) component (II-B) is aminated polyoxypropylene adduct of propylene oxide and hydroxyl initiator compounds selected from the group consisting of glycerine, trimethylol propane and diols having from 2 to about 8 carbon atoms and where there are present an average of from 1 to about 35 oxypropylene groups per molecule in said aminated adduct or mixture thereof: and
(iv) component (II-C) is oleoyl sarcosine, oleoyl glycine, stearoyl sarcosine, lauroyl sarcosine, octoyl sarcosine, caproyl sarcosine, cocoyl sarcosine, isooleoyl sarcosine, talloil sarcosine or mixtures thereof.

47. An active hydrogen-containing composition of claim 45 wherein
(i) component (I) is a glycerine or trimethylol propane initiated polyoxypropylene glycol capped with ethylene oxide such that about 50 percent of the hydroxyl groups are primary hydroxyl groups;
(ii) component (II-A) is zinc stearate, zinc oleate, zinc palmitate, zinc laurate, copper stearate, copper oleate, copper palmitate, copper laurate, nickel stearate, nickel oleate, nickel palmitate, nickel laurate or a mixture thereof:
(iii) component (II-B) is aminated polyoxypropylene adduct of propylene oxide and hydroxyl initiator compounds selected from the group consisting of glycerine, trimethylol propane and diols having from 2 to about 8 carbon atoms and where there are present an average of from 1 to about 35 oxypropylene groups per molecule in said aminated adduct or mixture thereof: and
(iv) component (II-C) is oleoyl sarcosine, oleoyl glycine, stearoyl sarcosine, lauroyl sarcosine, octoyl sarcosine, caproyl sarcosine, cocoyl sarcosine, isooleoyl sarcosine, talloil sarcosine or mixtures thereof.

48. The composition of claim 45 wherein
(i) component (i) is a glycerine or trimethylol propane initiated polyoxypropylene glycol capped with ethylene oxide such that about 50 percent of the hydroxyl groups are primary hydroxyl groups;
(ii) component (II-A) is zinc stearate, zinc oleate, zinc palmitate, zinc laurate, copper stearate, copper oleate, copper palmitate, copper laurate, nickel stearate, nickel oleate, nickel palmitate, nickel laurate or a mixture thereof:
(iii) component (II-B) is aminated polyoxypropylene adduct of propylene oxide and hydroxyl initiator compounds selected from the group consisting of glycerine, trimethylol propane and diols having from 2 to about 8 carbon atoms and where there are present from an average of from 1 to about 35 oxypropylene groups per molecule in said aminated adduct or mixture thereof: and
(iv) component (II-C) is oleic acid, stearic acid, lauric acid, palmitic acid or mixtures thereof.

49. An active hydrogen-containing composition comprising
(I) a polyether polyol terminated in primary or secondary hydroxyl groups and having a hydroxyl equivalent weight of from about 100 to about 2500: and
(II) an internal mold release composition which comprises
(A) a metal salt of an monocarboxylic acid wherein said acid has from about 10 to about 29 carbon atoms per molecule and said metal is zinc, copper or nickel:
(B) an aliphatic or aromatic compound having from 2 to 3 primary or secondary amine groups per molecule, or an alkanolamine having one primary or secondary amine group and one primary or secondary hydroxyl group per molecule, is free of oxyalkylene groups and has from about 2 to about 20 carbon atoms per molecule: and
(C) a monocarboxylic acid having from about 10 to about 29 carbon atoms per molecule:
and wherein the components are employed in quantities such that
(i) the weight ratio of components (II-C):(II-A) is from about 0.3:1 to about 3:1; and
(ii) components (II-C) and (II-B) are employed in quantities which provide from about 0.04 to about 2 equivalents of component (II-C) per amine nitrogen equivalent of component (II-B):
and the composition contains from about 0.5 to about 20 parts of component (II-A) per 100 parts by weight component (I).

50. An active hydrogen-containing composition comprising
(I) a polyether polyol terminated in primary or secondary hydroxyl groups and having a hydroxyl equivalent weight of from about 100 to about 2500: and
(II) an internal mold release composition which comprises
(A) a metal salt of a carboxylic acid having a terminal or pendant saturated or unsaturated aliphatic hydrocarbon chain having at least seven carbon atoms attached to a carbonyl group and from about 10 to 29 carbon atoms per molecule, wherein said metal is a member of Group II-B of the Periodic Table of Elements, aluminum, copper, iron, cobalt or nickel: and
(B) a material containing at least one aliphatic primary amine group and/or at least one aliphatic secondary amine group per molecule or a mixture of such materials:
said composition being devoid of an organic material containing at least one carboxylic acid group, phosphorus-containing acid group or boron-containing acid group or mixture of such materials wherein said organic material contains a siloxane chain or contains at least one terminal or pendant saturated or unsaturated aliphatic hydrocarbon chain containing at least about 7 carbon atoms:
wherein the components are employed in quantities such that components (II-A) and (II-B) are employed in quantities which provide from about 0.04 to about 2 equivalents of component (II-A) per amine nitrogen equivalent of component (II-B) and the composition contains from about 0.5 to about 20 parts of component (II-A) per 100 parts by weight component (I).

51. An isocyanate-reactive composition for use in a RIM process which comprises
(I) an isocyanate-reactive polymer having an average active hydrogen equivalent weight of from about 1000 to about 3000,
(II) about 5 to 50% by weight, based on the weight of component (I), of a chain extender comprising a sterically hindered aromatic diamine, and
(III) An effective amount of an internal mold release agent mixture comprising
(a) $Zn(OOCR)_2$ wherein the R group is chosen such that the (OOCR) group is a member selected from the group consisting of oleate, laurate, palmitate, stearate and mixtures thereof, and
(b) an acyclic material having an active hydrogen equivalent weight from about 15 to about 500 containing at least one primary amine group and/or at least one secondary amine group per molecule or a mixture of such materials.

52. An active hydrogen-containing composition which comprises:
(A) a relatively high equivalent weight active hydrogen-containing material terminated in hydroxyl groups or mixture thereof;

(B) a mixture of relatively low equivalent weight active-hydrogen containing materials comprising
(i) at least one material having a plurality of hydroxyl groups, and
  (ii) at least one material having a plurality of primary and/or secondary amine groups, said materials having a plurality of primary and/or secondary amine groups being present in an amount sufficient to solubilize at least 0.1% by weight of component (C) in said active hydrogen containing composition, and
(C) at least one material containing at least one carboxylic acid group and which contains a saturated or unsaturated aliphatic hydrocarbon chain wherein said acid group has been at least partially reacted, complexed or associated with a metal from group II-B of the Periodic Table of the Elements, aluminum, copper, iron, cobalt or nickel.

53. The composition of claim 52 wherein component (A) comprises a polyether polyol, component (B)(i) comprises an ethylene and/or propylene oxide derivative of ethylene diamine, and component (C) comprises zinc stearate.

54. The composition of claim 53 wherein component (B)(ii) comprises a mixture of an aminated polyoxypropyleneglycol having an average molecular weight of about 400 and diethyltoluenediamine.

* * * * *